US012401316B2

(12) United States Patent
Yu et al.

(10) Patent No.: US 12,401,316 B2
(45) Date of Patent: Aug. 26, 2025

(54) PARALLEL DRIVING DEVICE

(71) Applicant: Changzhou Arctech Solar New Energy Tech. Co. Ltd., Jiangsu (CN)

(72) Inventors: Zhengming Yu, Jiangsu (CN); Yongquan Mao, Jiangsu (CN); Yongqing Liu, Jiangsu (CN)

(73) Assignee: Changzhou Arctech Solar New Energy Technology Co., LTD, Jiangsu (CN)

( * ) Notice: Subject to any disclaimer, the term of this patent is extended or adjusted under 35 U.S.C. 154(b) by 0 days.

(21) Appl. No.: 18/834,305

(22) PCT Filed: May 31, 2023

(86) PCT No.: PCT/CN2023/097527
§ 371 (c)(1),
(2) Date: Jul. 30, 2024

(87) PCT Pub. No.: WO2024/037114
PCT Pub. Date: Feb. 22, 2024

(65) Prior Publication Data
US 2025/0192716 A1 Jun. 12, 2025

(30) Foreign Application Priority Data

Aug. 16, 2022 (CN) ......................... 202222152292.3

(51) Int. Cl.
*F16H 1/20* (2006.01)
*F16H 1/22* (2006.01)
(Continued)

(52) U.S. Cl.
CPC .............. *H02S 20/32* (2014.12); *F16H 1/22* (2013.01); *F16H 57/039* (2013.01);
(Continued)

(58) Field of Classification Search
CPC .......... H02S 20/32; F16H 1/12; F16H 57/039; F16H 2057/02034; F16H 2057/02039; H02K 7/1166
See application file for complete search history.

(56) References Cited

U.S. PATENT DOCUMENTS

| 12,021,484 B2 | 6/2024 | Wang et al. | |
|---|---|---|---|
| 2015/0210253 A1* | 7/2015 | Qi | ........................... B60T 7/085 188/162 |
| 2019/0296686 A1* | 9/2019 | Kresse | ................... H02S 20/10 |

FOREIGN PATENT DOCUMENTS

| CN | 214946114 U | 11/2021 |
|---|---|---|
| CN | 214946115 U | 11/2021 |

(Continued)

*Primary Examiner* — Zakaria Elahmadi
(74) *Attorney, Agent, or Firm* — Woodard, Emhardt, Henry, Reeves & Wagner, LLP

(57) ABSTRACT

The present application discloses a parallel driving device comprising: a first transmission member, a second transmission member meshed with the first transmission member, a third transmission member coaxial to the second transmission member, a fourth transmission member meshed with the upper side of the third transmission member, a fifth transmission member parallelly meshed with the upper side of the fourth transmission member, a sixth transmission member coaxial to the fifth transmission member and a seventh transmission member meshed with the upper side of the sixth transmission member. The seventh transmission member is axially perpendicular to the sixth transmission member, and the seventh transmission member is parallelly arranged above the first transmission member. The parallel driving device is simple and compact in structure, low in cost, convenient to maintain, improved in reliability and beneficial to achieve stable parallel driving.

11 Claims, 14 Drawing Sheets

(51) Int. Cl.
*F16H 57/039* (2012.01)
*H02S 20/32* (2014.01)
*F16H 57/02* (2012.01)
*H02K 7/116* (2006.01)

(52) U.S. Cl.
CPC .............. *F16H 2057/02034* (2013.01); *F16H 2057/02039* (2013.01); *H02K 7/1166* (2013.01)

(56) References Cited

FOREIGN PATENT DOCUMENTS

| | | | | |
|---|---|---|---|---|
| CN | 215222095 U | | 12/2021 | |
| CN | 216751627 U | * | 6/2022 | |
| CN | 217736234 U | | 11/2022 | |
| DE | 102015101134 A1 | * | 7/2015 | ............ B60T 13/741 |

* cited by examiner

PARALLEL DRIVING DEVICE

FIELD OF THE DISCLOSURE

The present application relates to the technical field of a driving device for a photovoltaic tracking support, and further relates to a parallel driving device.

BACKGROUND

In the field of driving devices of photovoltaic tracking supports, due to the insufficient stability and wind resistance of single-point driven tracking supports, the application of multi-point synchronous driving devices in the field of photovoltaic tracking support is increasing. But as far as the current situation is concerned, the drive shaft and the output shaft in most multi-point synchronous driving devices are usually in a non-parallel configuration, which brings a certain risk of jamming during the system operation. The transmission members of some parallel driving devices are subjected to large forces, short lifespan and poor transmission stability during transmission.

SUMMARY OF THE INVENTION

In view of the above technical issues, the purpose of this application is to provide a parallel driving device with simple and compact structure, low cost, easy maintenance, improved reliability, and stable realization of parallel drive.

In order to achieve the purpose mentioned above, the present application provides a parallel driving device, comprising:
- a first transmission member;
- a second transmission member, which meshes with the first transmission member, wherein the first transmission member is axially perpendicular to the second transmission member;
- a third transmission member, arranged coaxially with the second transmission member;
- a fourth transmission member, which is located on an upper side of the third transmission member and meshes with the third transmission member, wherein the fourth transmission member is arranged axially in parallel with the third transmission member;
- a fifth transmission member, which is located on an upper side of the fourth transmission member and meshes with the fourth transmission member, wherein the fifth transmission member is arranged axially in parallel with the fourth transmission member;
- a sixth transmission member, which is arranged coaxially with the fifth transmission member;
- a seventh transmission member, which is located on an upper side of the sixth transmission member and meshes with the sixth transmission member, wherein the seventh transmission member is axially perpendicular to the sixth transmission member, and the seventh transmission member is arranged above the first transmission member and axially in parallel with the first transmission member.

Some embodiments further comprise a drive motor, located axially on either side of the first transmission member, wherein the drive motor is connected to the first transmission member, and by driving the first transmission member to rotate, the drive motor drives the second transmission member, the third transmission member, the fourth transmission member, the fifth transmission member, the sixth transmission member and the seventh transmission member to rotate synchronously.

Some embodiments further comprise a housing, wherein the first transmission member, the second transmission member, the third transmission member, the fourth transmission member, the fifth transmission member, the sixth transmission member and the seventh transmission member are arranged inside the housing.

In some embodiments, the first transmission member is configured on a first shaft, and both ends of the first shaft pass through the housing and are exposed outside the housing, and a driving end of the drive motor is directly connected to one end of the first shaft, and the end of the first shaft connected to the driving end of the drive motor forms a power input end of the parallel driving device, and the other end of the first shaft forms a first power output end of the parallel driving device.

In some embodiments, the third transmission member is configured on a third shaft, and the third shaft passes through the housing, and a part of the third shaft exposed outside the housing forms a second power output end of the parallel driving device;
- or, the fourth transmission member is configured on a fourth shaft, and the fourth shaft passes through the housing, and a part of the fourth shaft exposed outside the housing forms a second power output end of the parallel driving device;
- or, the fifth transmission member is configured on a fifth shaft, and the fifth shaft passes through the housing, and a part of the fifth shaft exposed outside the housing forms a second power output end of the parallel driving device.

In some embodiments, the third transmission member is configured on a third shaft, and the third shaft is arranged wholly inside the housing.

In some embodiments, the third transmission member is arranged on a third shaft, and the fifth transmission member is arranged on a fifth shaft, and a bearing seat is fixed onto the third shaft or onto the fifth shaft, and the bearing seat has a protruding mounting part in a radial direction of the third shaft or the fifth shaft, and the fourth transmission member is installed onto the mounting part through a fourth shaft, wherein the fourth transmission member and the fourth shaft are configured to rotate relative to the mounting part, and the fourth shaft is parallel to both the third shaft and the fifth shaft, and two sides of the fourth transmission member in a height direction mesh with the third transmission member and the fifth transmission member respectively.

In some embodiments, the mounting part is provided with at least two mounting holes, and the fourth shaft is mounted in one of the mounting holes, wherein the centers of the two mounting holes are located on an arc, and the fourth shaft is configured to be installed in either of the mounting holes.

In some embodiments, the third transmission member, the fourth transmission member and the fifth transmission member are all configured as gears, and axes of the third transmission member, the fourth transmission member and the fifth transmission member are parallel to each other, and numbers of teeth of the third transmission member, the fourth transmission member and the fifth transmission member increase sequentially.

In some embodiments, planes where end surfaces of the third transmission member, end surfaces of the fourth transmission member and end surfaces of the fifth transmission member locate are at a same side of the first transmission member, the second transmission member, the sixth transmission member and the seventh transmission member.

In some embodiments, the sixth transmission member is a toroidal worm, and the seventh transmission member is a worm wheel, wherein the worm meshes with the worm wheel in transmission, and end surfaces on both sides of the worm wheel are respectively provided with a connecting part, and the connecting parts form third power output ends of the parallel driving device.

In some embodiments, the connecting part comprises an end portion and a shaft head, wherein the end portion is fixed to the seventh transmission member, and an outer contour of a cross-section of the shaft head is a polygon of arcs and lines, and the shaft head is configured to engage a photovoltaic main shaft which has an inner contour of a polygon of arcs and lines; and the shaft head comprises a first flat plate, a second flat plate, a third flat plate, a first arc plate, a second arc plate and a third arc plate, wherein the first arc plate is connected between the second flat plate and the third flat plate, and the second arc plate is connected between the first flat plate and the second flat plate, and the third arc plate is connected between the first flat plate and the third flat plate, and the first arc plate, the second arc plate and the third arc plate are arc plates distributed on a same cylindrical surface, wherein the cylindrical surface is coaxial with the seventh transmission member.

In some embodiments, the connecting part comprises an end portion and a shaft head, wherein the end portion is fixed to the seventh transmission member, and the shaft head comprises a tubular wall extending from the end portion to one side, and a cross section of the tubular wall is a convex pentagon, and the tubular wall is configured to fittingly insert into a photovoltaic main shaft with a convex pentagon inner contour; and the tubular wall is provided with a plurality of circumferentially distributed mounting holes to fix the photovoltaic main shaft which has a convex pentagon inner contour.

Compared with the prior arts, the parallel driving device provided by the present application has the following beneficial effects:

1. Through the arrangement and cooperation of multiple transmission members, the parallel driving device provided by the present application makes the first transmission member and the seventh transmission member parallel to each other in the axial direction. The seventh transmission member on the upper side can engage and drive a main shaft. Photovoltaic panels installed on the main shaft can be driven to rotate. The first transmission member at the bottom also acts as a synchronous shaft, and serves as another route of parallel output, so that the parallel driving device can be applied to a multi-point synchronously driven solar tracking system to achieve stable parallel driving.
2. In the parallel driving device provided by the present application, the position of the drive motor can be arranged flexibly, which might save the assembly space of the parallel driving device at the photovoltaic tracking support. The sizes of the third transmission member, the fourth transmission member and the fifth transmission member are successively increasing, achieving a transmission ratio amplification effect of a three-stage transmission, so that a motor with a smaller power can output a larger torque. The configuration of the fourth transmission member can improve the transmission stability, and increase the distance between the second transmission member and the main shaft at the same time, which makes it easy to adapt to various main shafts, achieving high versatility.
3. In the parallel driving device provided by the present application, all transmission members are arranged in the housing. The first transmission member, the second transmission member, the third transmission member and the fourth transmission member are arranged relatively in a lower layer of the housing. The fifth transmission member, the sixth transmission member and the seventh transmission member are arranged relatively in an upper layer, so that a two-layer arrangement is achieved. This makes the housing more rigid and the deformation of the housing structure can be effectively reduced during operation. The weight and cost of the housing can also be reduced.
4. In the parallel driving device provided by the present application, the transmission members are arranged in three independent grease lubricated chambers in the housing: a vertical meshing chamber for the first transmission member and the second transmission member, the parallel meshing chamber for the third transmission member, the fourth transmission member and the fifth transmission member, another vertical meshing chamber for the sixth transmission member and the seventh transmission member. Each chamber is separated by oil seals, and has independent grease injection ports, which greatly reduces the amount of grease, ensures the overall lubrication and effective sealing, and also reduces the cost, and increases the maintenance-free time.
5. The parallel driving device provided by the present application configures the drive motor to directly drive a shaft on the housing, achieving a serial driving in the north-south direction. The configuration further achieves strong terrain adaptability and high reliability, and the installation base of the parallel driving device can be directly mounted to a post, achieving easy installation.
6. In the parallel driving device provided by the present application, the shaft head of the connecting part can optionally have a convex pentagon contour or a contour as a polygon of arcs and lines, so as to engage a photovoltaic main shaft with a corresponding cross-section contour.

BRIEF DESCRIPTION OF THE DRAWINGS

In the following preferred embodiments, the above-mentioned characteristics, technical features, advantages and implementation methods of the present application will be further described in a clear and understandable manner with reference to the accompanying drawings.

EXPLANATION OF REFERENCE NUMBERS

Figure 1:
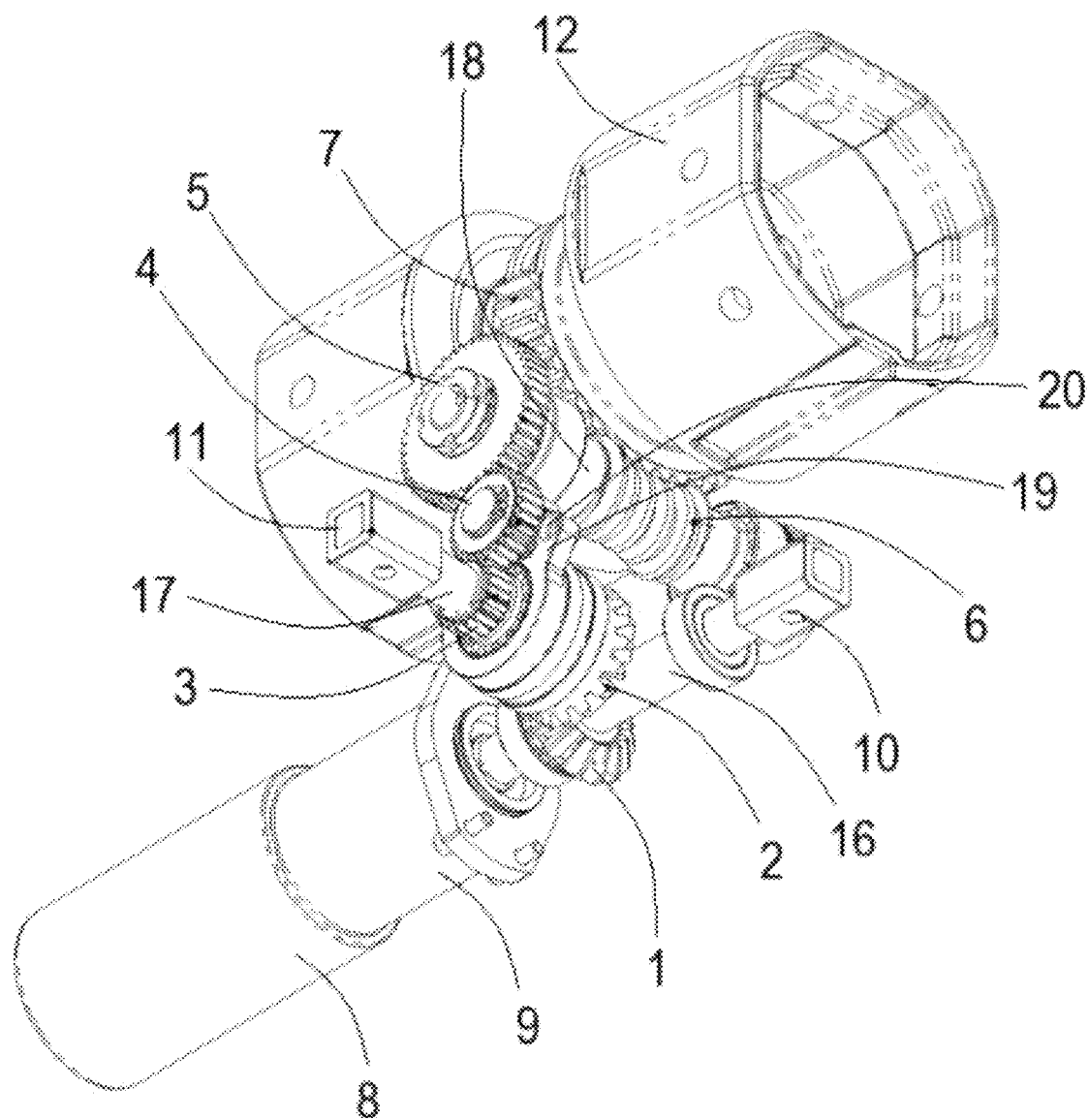
FIG. 1 is a schematic diagram of the three-dimensional structure of the parallel driving device of a preferred embodiment of the present application.
Figure 2:
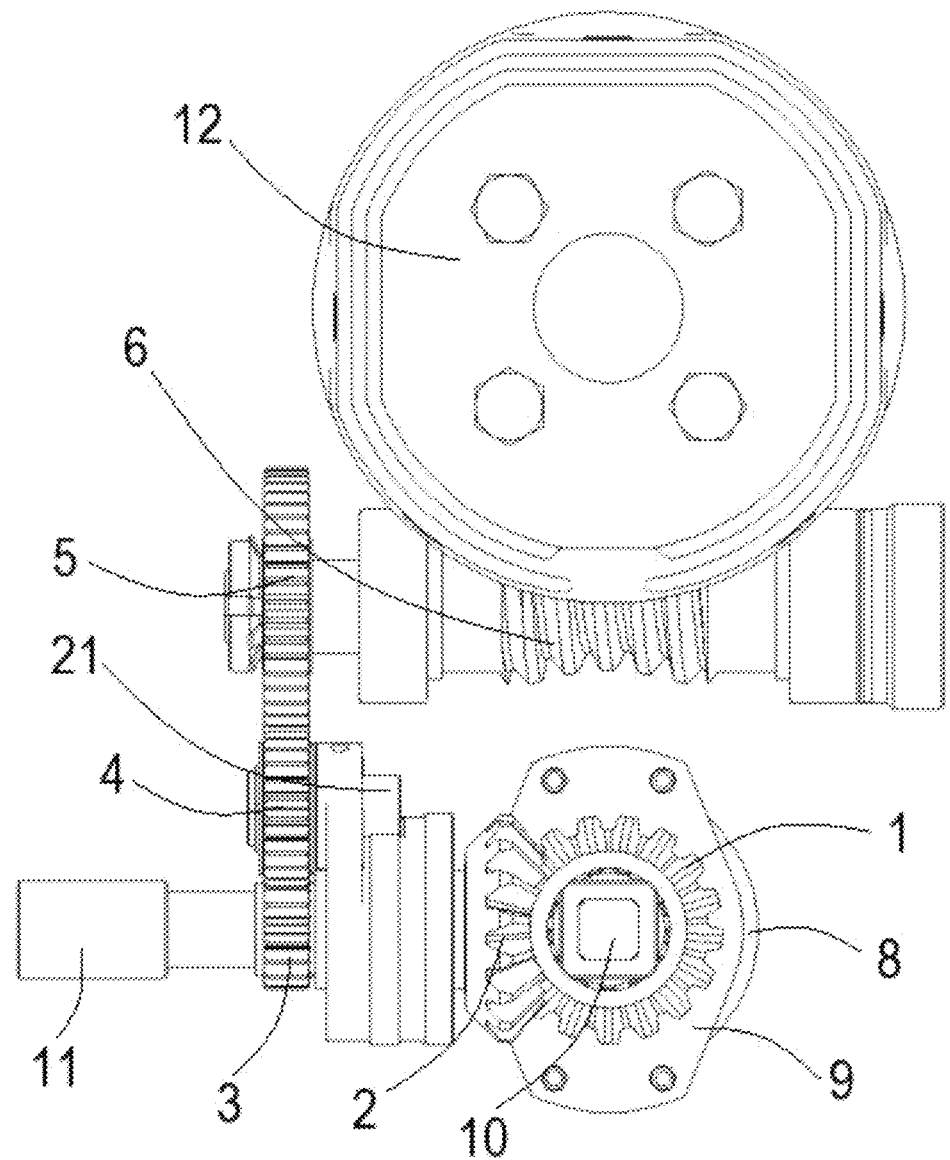
FIG. 2 is a front view of the preferred embodiment of the parallel driving device of the present application.
Figure 3:
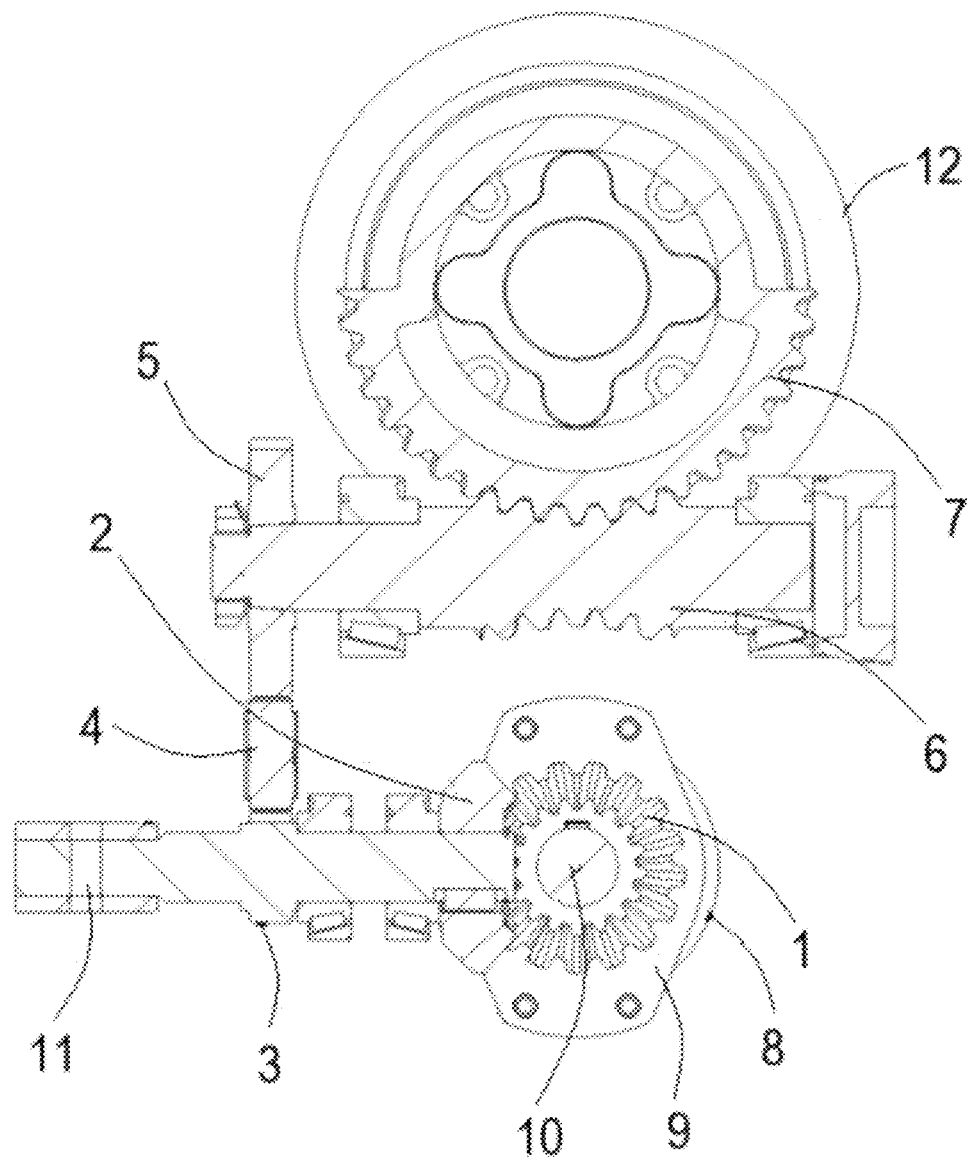
FIG. 3 is a cross-sectional view of the preferred embodiment of the parallel driving device of the present application.
Figure 4:
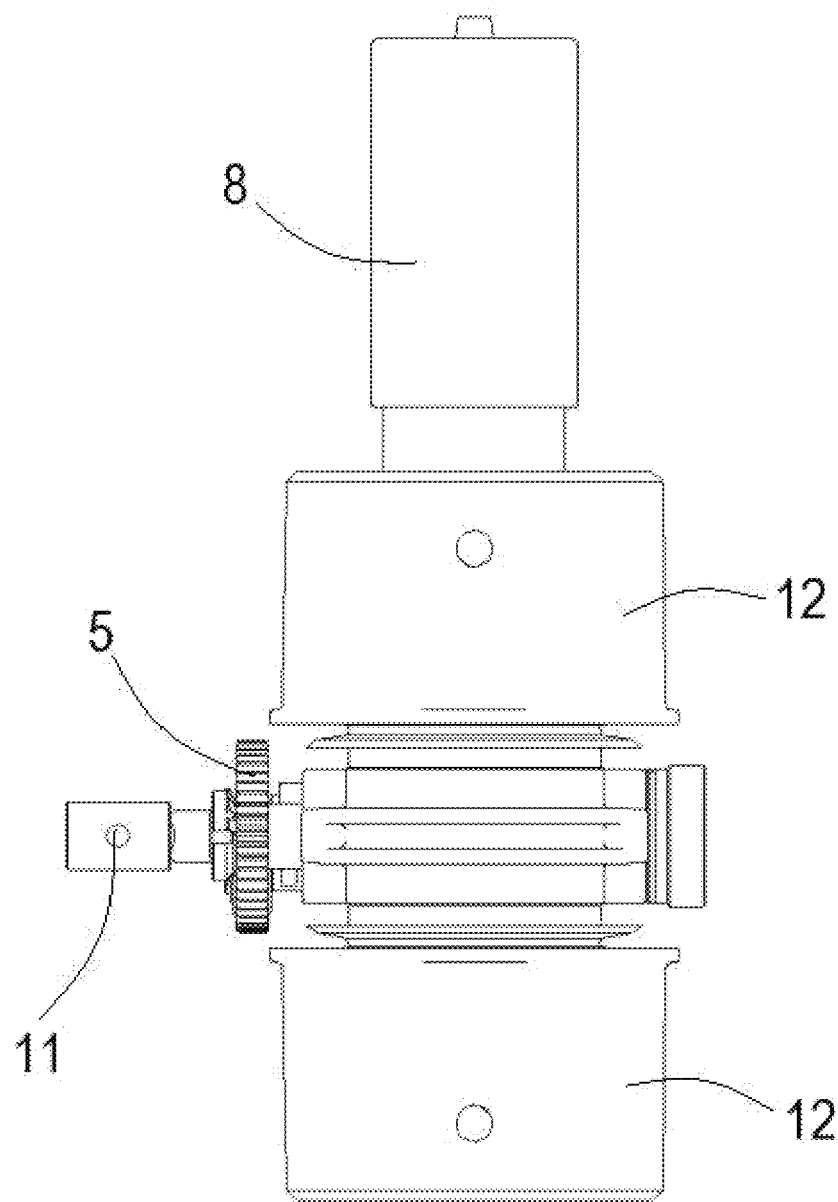
FIG. 4 is a top view of the preferred embodiment of the parallel driving device of the present application.
Figure 5:
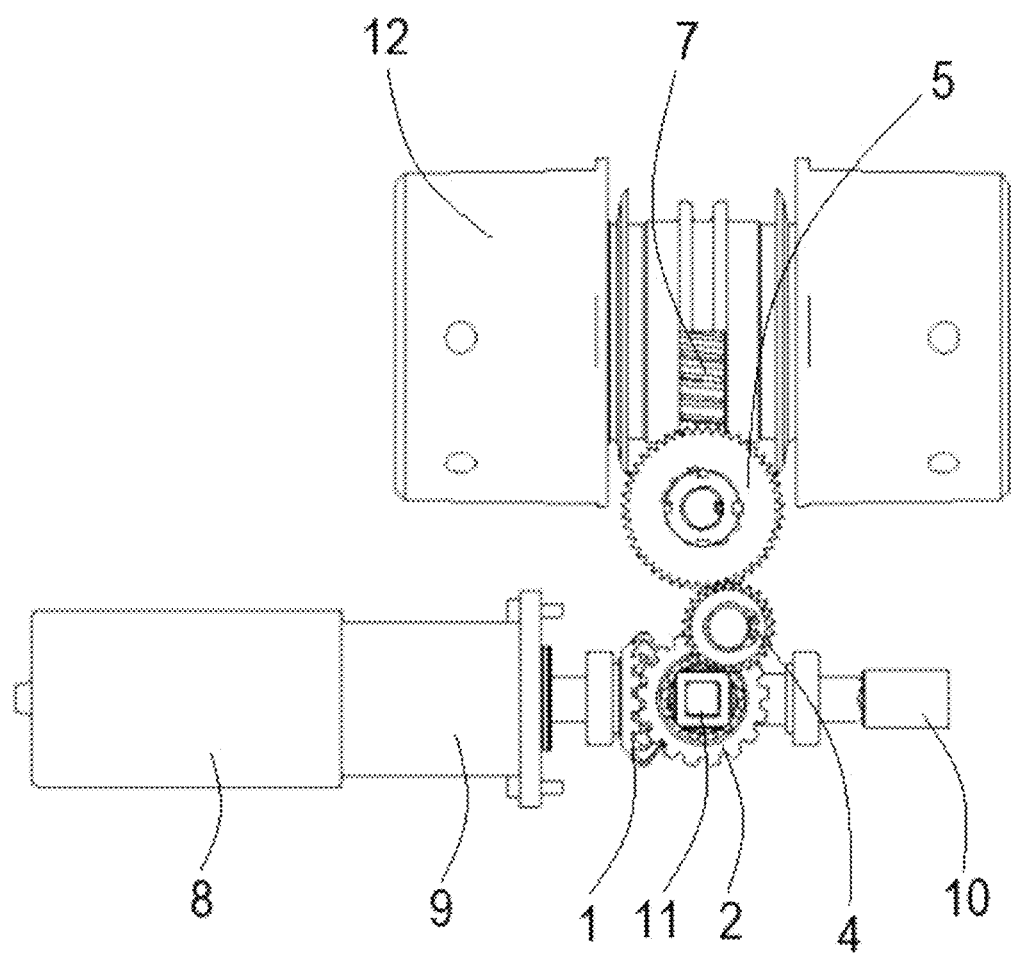
FIG. 5 is a side view of the parallel driving device of the preferred embodiment of the present application.
Figure 6:
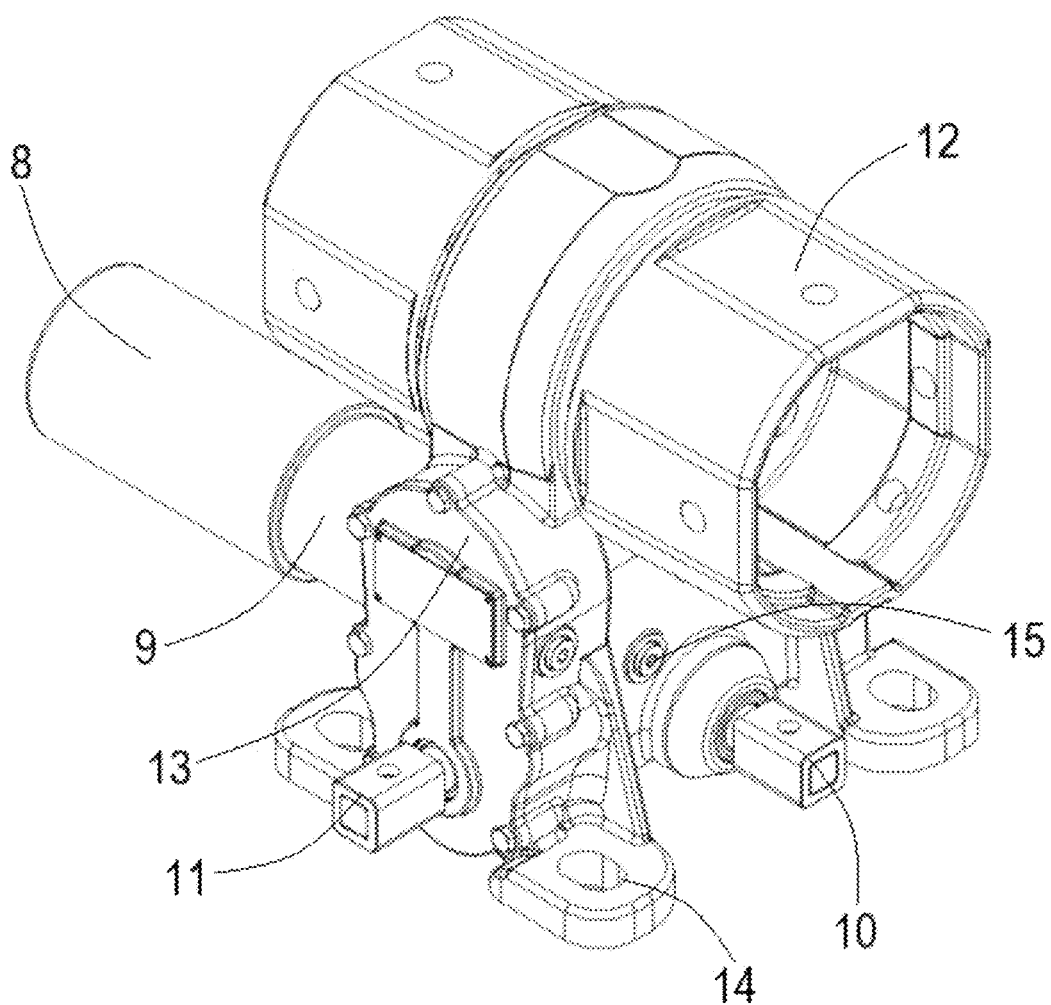
FIG. 6 is a schematic structural diagram of a parallel driving device with a housing in a preferred embodiment of the present application.
Figure 7:
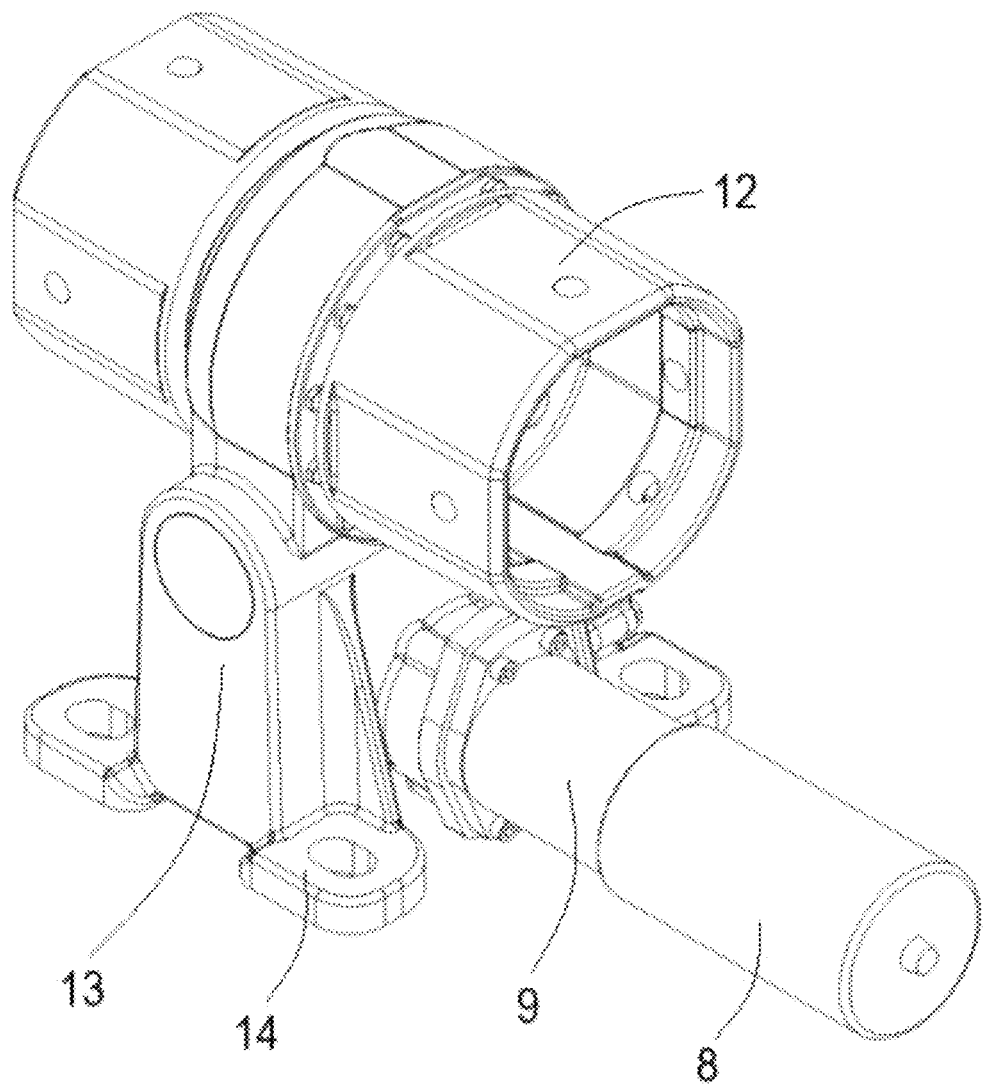
FIG. 7 is a schematic structural diagram of the parallel driving device with a housing in the preferred embodiment of the present application from another viewing angle.
Figure 8:
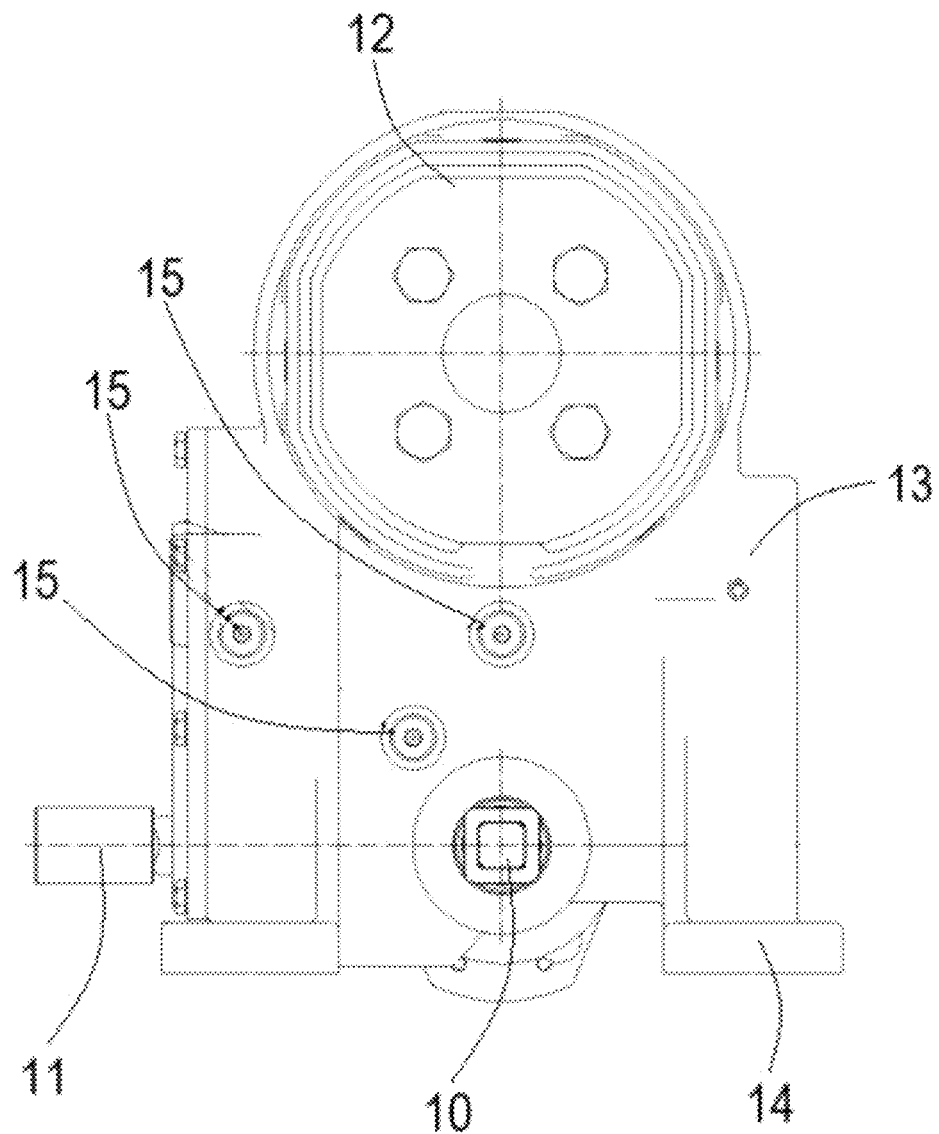
FIG. 8 is a front view of the parallel driving device with a housing in the preferred embodiment of the present application.

First transmission member 1, Second transmission member 2, Third transmission member 3, Fourth transmission member 4, Fifth transmission member 5, Sixth transmission member 6, Seventh transmission member 7, Drive motor 8, Planetary gear set 9, First power output end 10, Second power output end 11, Connecting part 12, Housing 13, Mounting seat 14, Grease injection port 15, First shaft 16, Third shaft 17, Fifth shaft 18, Bearing seat 19, Mounting hole 20, Fourth shaft 21, End portion 22, Shaft head 23, First flat plate 24, First arc plate 25, Second flat plate 26, Second arc plate 27, Third flat plate 28, Third arc plate 29, First wall plate 30, Second wall plate 31, Third wall plate 32, Fourth wall plate 34, Boss 35.

DESCRIPTION OF THE ILLUSTRATED EMBODIMENTS

In order to more clearly illustrate the embodiments of the present application or the technical solutions in the prior art, the specific embodiments of the present application will be described below with reference to the accompanying drawings. Obviously, the accompanying drawings in the following description are only some embodiments of the present application, and for those of ordinary skill in the art, other drawings can also be obtained from these drawings without creative efforts, to obtain other embodiments.

In order to keep the drawings concise, only the parts related to the application are schematically shown in each figure, and they do not represent the actual structure of the products. In addition, in order to make the drawings concise and easy to understand, in some figures, only one of the components having the same structure or function is schematically shown, or only one of them is marked. As used herein, "one" not only means "only one", but also "more than one".

It should also be further understood that, as used in this specification and the claims, the term "and/or" refers to and including any and all possible combinations of one or more of the associated listed items.

In this description, it should be noted that, unless otherwise expressly specified and limited, the terms "installed", "connected" and "connecting" should be understood in a broad sense. For example, it may be a fixed connection or a detachable connection, or it can be connected into a whole piece; or it can be a mechanical connection or an electrical connection; or it can be directly connected or indirectly connected through an intermediate medium, and it can be internal communication between two components. For those of ordinary skill in the art, the specific meanings of the above terms in the present application can be understood in specific situations.

In addition, in the description of the present application, the terms "first", "second" and the like are only used to distinguish the features, and should not be understood as indicating or implying relative importance.

In one embodiment, referring to the accompanying drawings FIG. 1 to FIG. 5 of the specification, a parallel driving device provided by the present application comprises: a first transmission member 1, a second transmission member 2, a third transmission member 3, a fourth transmission member 4, a fifth transmission member 5, a sixth transmission member 6 and a seventh transmission member 7. The second transmission member 2 is meshed with the first transmission member 1, and the axis of the first transmission member 1 is perpendicular to the axis of the second transmission member 2. The third transmission member 3 is coaxially arranged with the second transmission member 2. The fourth transmission member 4 is located on the upper side of the third transmission member 3 and meshed with the third transmission member 3. The fourth transmission member 4 is arranged in parallel with the third transmission member 3 in the axial direction. The fifth transmission member 5 is located on the upper side of the fourth transmission member 4 and meshed with the fourth transmission member 4. The fifth transmission member 5 and the fourth transmission member 4 are arranged parallelly in the axial direction. The sixth transmission member 6 and the fifth transmission member 5 are coaxially arranged. The seventh transmission member 7 is located at the upper side of the sixth transmission member 6 and is meshed with the sixth transmission member 6. The axis of the seventh transmission member 7 is perpendicular to the axis of the sixth transmission member 6. The seventh transmission member 7 is above the first transmission member 1 and they are axially parallel to each other. The first transmission member 1, the second transmission member 2, the third transmission member 3, the fourth transmission member 4, the fifth transmission member 5, the sixth transmission member 6 and the seventh transmission member 7 can rotate around their own axes respectively. The seventh transmission member 7 is arranged above the first transmission member 1 and parallel to each other in the axial direction, so as to avoid the jamming issue of each transmission member during the transmission process and improve the stability of the transmission.

In this embodiment, the first transmission member 1 and the seventh transmission member 7 are parallel to each other in the axial direction through the arrangement and cooperation of a plurality of transmission members, so that the parallel driving of the two transmission members can be realized. In practical application, the seventh transmission member 7 is above the first transmission member 1, and the seventh transmission member 7 can be connected to the main shaft of a photovoltaic tracking support through a connecting member 12, so that the seventh transmission member 7 and the main shaft rotate synchronously. Photovoltaic panels are installed on the main shaft and the main shaft drives the photovoltaic panels to rotate. Specifically, the connecting part 12 is tubular in form, and the two connecting parts 12 extend respectively from the seventh transmission member 7 along the axial to the sides. One end of the connecting part 12 is detachably fixed to an end of the seventh transmission member 7, while the other end away from the seventh transmission member 7 is engaged to the main shaft, wherein the connecting member 12 and the main shaft are fastened by fasteners. The first transmission member 1 is arranged on a first shaft 16, and is arranged below the seven transmission members 7. The seventh transmission member 7 serves as a route of parallel output. The first transmission member 1 serves as another route of parallel output. The seventh transmission member 7 can be arranged directly above the first transmission member 1 to make the parallel driving of the two transmission members more stable, and to make it easy to install in the photovoltaic tracking support system, and to improve reliability. There is no height difference between the first transmission member 1 and the second transmission member 2 in the height direction, which makes the overall structure more compact.

In one embodiment, referring to the accompanying drawings FIG. 1 to FIG. 5 of the specification, on the basis of the above-mentioned embodiments, the parallel driving device further comprises a drive motor 8 located on either side of the first transmission member 1 in the axial direction. The drive motor 8 is connected to the first transmission member 1. Preferably, the drive motor 8 is directly connected to the first transmission member 1, so that the overall structure of the parallel driving device is compact. The drive motor 8 drives the second transmission member 2, the third transmission member 3, the fourth transmission member 4, the fifth transmission member 5, the sixth transmission member 6 and the seventh transmission member to rotate synchronously by driving the first transmission member 1.

Furthermore, the parallel driving device further comprises a planetary gear set 9 through which the drive motor 8 is in transmission connection with the first transmission member 1. By providing the planetary gear set 9, the drive motor 8 is reduced and the driving torque of the drive motor 8 is amplified by the planetary gear set 9. The transmission route is short, and the efficiency is higher. More preferably, the planet carrier of the planetary gear set 9 is meshed with the connected transmission member to drive the corresponding transmission member to rotate synchronously. Specifically, the planetary gear set 9 is configured as a multi-stage planetary gear set, such as a three-stage planetary gear set, and more preferably a four-stage planetary gear set. The first-stage sun gear of the multi-stage planetary gear set is connected with the drive motor 8, and the last-stage planet carrier of the multi-stage planetary gear set is meshed with the connected transmission member.

In one embodiment, referring to the accompanying drawings FIG. 1 to FIG. 8 of the specification, on the basis of the above embodiments, the parallel driving device further comprises a housing 13. The first transmission member 1, the second transmission member 2, the third transmission member 3, the fourth transmission member 4, the fifth transmission member 5, the sixth transmission member 6, and the seventh transmission member 7 are arranged inside the housing 13. The planetary gear set 9 is arranged inside or outside the housing 13. The housing 13 has an upper chamber, a lower chamber and an external hanging chamber. The first transmission member 1 and the second transmission member 2 are arranged in the lower chamber of the housing 13. The third transmission member 3, the fourth transmission member 4 and the fifth transmission member 5 are arranged in the external hanging chamber. The sixth transmission member 6 and the seventh transmission member 7 are arranged in the upper chamber of the housing 13. The upper chamber and the lower chamber are arranged in two layers respectively, so that the rigidity of the housing 13 is better, and the deformation of the housing structure can be effectively reduced during operation. The weight and cost of the housing 13 can also be reduced.

Furthermore, at least one grease injection port 15 each is respectively provided on the housing 13 at positions corresponding to the upper chamber, the lower chamber and the external hanging chamber. Thus, the arrangement constitutes three separate grease lubricated chambers: the vertical meshing chamber of the first transmission member 1 and the second transmission member 2, the parallel meshing chamber of the third transmission member 3, the fourth transmission member 4 and the fifth transmission member 5, the vertical meshing chamber of the sixth transmission member 6 and the seventh transmission member 7. Each chamber can be isolated by oil seals, and has an independent grease injection port 15, which greatly reduces the amount of grease and ensures the overall lubrication and effective sealing, which also reduces the cost, and increases the maintenance-free time.

In order to make the structure of the whole device more compact and concise, the planes where the third transmission member 3, the fourth transmission member 4, and the fifth transmission member 5 are located are all configured on the same side of the first transmission member 1, the second transmission member 2, the sixth transmission member 6 and the seventh transmission member 7. The planetary gear set 9 can optionally be placed inside or outside the housing 13. When the built-in configuration is selected, since the multi-stage planetary gear set is built inside the housing 13, it does not take up extra space, and at the same time, it can be effectively protected by the housing. The effects of weather resistance and leakage prevention are effectively enhanced. In addition, the housing 13 is also provided with a mounting seat 14 with mounting holes, which can be directly mounted onto the post of the photovoltaic tracking support system, which is convenient for installation.

In one embodiment, referring to the accompanying drawings FIG. 1 to FIG. 8 of the specification, on the basis of the above embodiments, both ends of the first shaft 16 which is provided with the first transmission member 1 pass through the housing 13 and are exposed outside the housing 13. The driving end of the drive motor 8 is directly connected to one end of the first shaft 16. The end of the first shaft 16 connected to the drive motor 8 constitutes the power input end of the parallel driving device, and the other end of the first shaft 16 constitutes a first power output end 10 of the parallel driving device.

Furthermore, a third shaft 17 which is provided with the third transmission member 3 passes through the housing 13 and is exposed outside the housing 13. The part of the third shaft 17 exposed outside the housing 13 constitutes a second power output end 11 of the parallel driving device.

Alternatively, a fourth shaft 21 which is provided with the fourth transmission member 4 passes through the housing and is exposed outside the housing 13. The part of the fourth shaft 21 exposed outside the housing 13 constitutes the second power output end 11 of the parallel driving device.

Alternatively, a fifth shaft 18 which is provided with the fifth transmission member 5 passes through the housing and is exposed outside the housing 13. The part of the fifth shaft 18 exposed outside the housing 13 constitutes the second power output end 11 of the parallel driving device.

Figure 9:
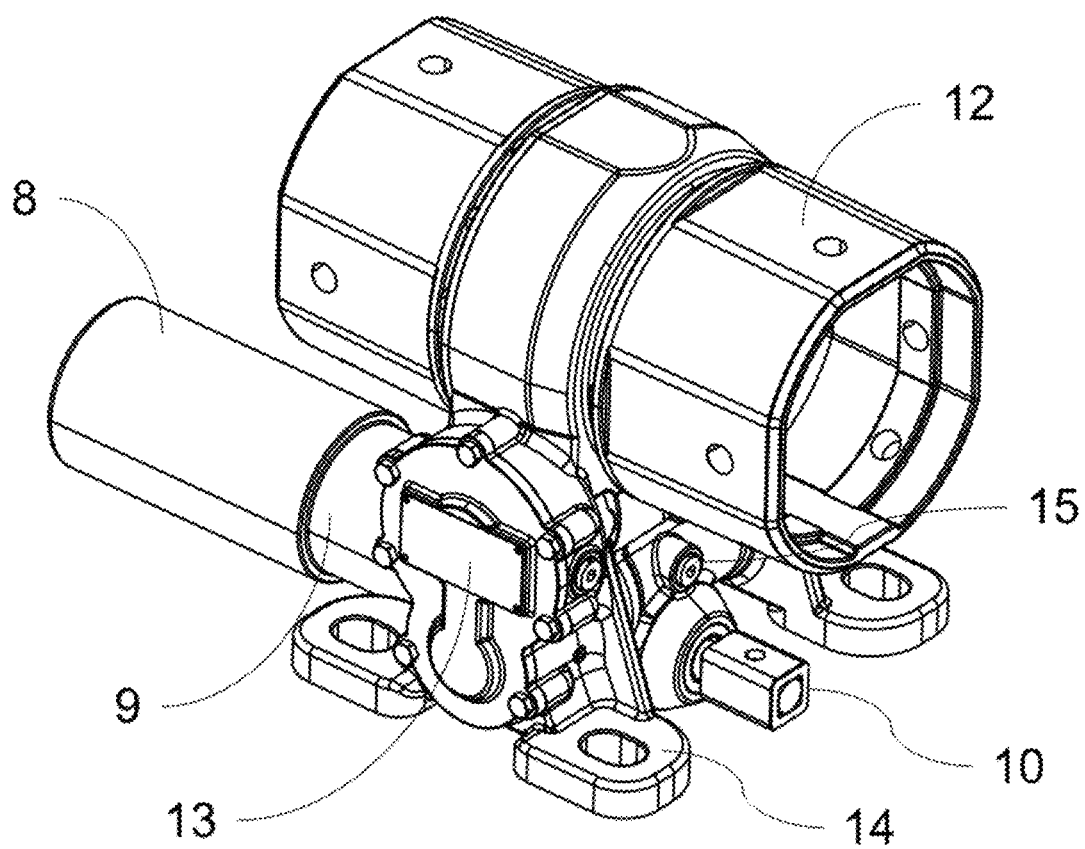
FIG. 9 is a schematic structural diagram of a parallel driving device with a housing in another preferred embodiment of the present application.

In one embodiment, referring to the accompanying FIG. 9 of the specification, the third shaft 17 which is provided with the third transmission member 3 is wholly arranged inside the housing 13.

In one embodiment, referring to the accompanying drawings FIG. 1 to FIG. 8 of the specification, the third transmission member 3 is arranged on the third shaft 17, the fifth transmission member 5 is arranged on the fifth shaft 18, and the third shaft 17 or the fifth shaft 18 is sleeved with a bearing seat 19, and the bearing seat 19 has a mounting part protruding in a radial direction of the third shaft 17 or the fifth shaft 18. The fourth transmission member 4 is mounted on the mounting part through the fourth shaft 21, and the fourth shaft 21 is configured to be able to rotate relative to the mounting part. Preferably, the mounting part is provided with a mounting hole 20, and the fourth shaft 21 and the fourth transmission member 4 can rotate around the axis of the mounting hole 20. The two sides of the fourth transmission member 4 in the height direction are simultaneously engaged with the third transmission member 3 and the fifth transmission member 5 respectively.

Furthermore, the mounting part is provided with at least two mounting holes 20, and the fourth shaft 21 is installed in one of the mounting holes 20. The centers of at least two mounting holes 20 are located on an arc, and the fourth shaft 21 can be selectively installed in any one of the mounting holes 20. Fourth transmission members 4 with different sizes and different numbers of teeth can be selected, and the transmission ratio between the third transmission member 3, the fourth transmission member 4 and the fifth transmission member 5 can be adjusted to obtain better transmission effect.

In another embodiment, the bearing seat 19 may not be provided. By configuring one end of the fourth shaft 21 onto the housing 13, the fourth shaft 21 can rotate relative to the housing 13. Preferably, one end of the fourth shaft 21 connected to the housing 13 is positioned through a bearing and a bearing seat, which is a common implementation method for those skilled in the art, and will not be described in detail.

The drive motor 8 is drivingly connected to either end of the first transmission member 1 through the planetary gear set 9, that is, the drive motor 8 can be arranged on either side of the north-south direction, which may save the assembly space of the parallel driving device on the photovoltaic tracking support. Both the first transmission member 1 and the second transmission member 2 are bevel gear shafts, and they are meshed and connected at 90° to constitute a bevel gear shaft pair. More preferably, the transmission ratio of the gears on the first transmission member 1 and the second transmission member 2 is 1:1.

The third transmission member 3, the fourth transmission member 4 and the fifth transmission member 5 are all configured as cylindrical gears, and the three transmission members are axially parallelly meshed and connected to constitute parallel cylindrical gear pairs. The second transmission member 2 is connected with the third transmission member 3 through a shaft key. Specifically, one end of the second transmission member 2 is connected to the cylindrical gear of the third transmission member 3 through the shaft key, and the transmission member 2 rotates coaxially with the third transmission member 3. More preferably, the numbers of teeth of the third transmission member 3, the fourth transmission member 4, and the fifth transmission member 5 are sequentially increased to realize a three-stage transmission ratio amplification, so that the drive motor 8 with a smaller power can generate a larger torque. At the same time, the third transmission member 3, the fourth transmission member 4 and the fifth transmission member 5 amplify the torque step by step, so as to prevent the transmission members from being subjected to greater impact and to improve the service life of the transmission members. In addition, the arrangement of the fourth transmission member 4 can increase the distance between the second transmission member 2 and the main shaft at the same time, which makes the parallel driving device applicable to main shafts of various specifications, achieving high versatility.

The sixth transmission member 6 is a toroidal worm, and the seventh transmission member 7 is a worm wheel, wherein the worm and the worm wheel are meshed for transmission. Each end wall on two sides of the worm wheel is provided with a connecting part 12 respectively, and the connecting parts 12 constitute two third power output ends of the parallel driving device. The sixth transmission member 6 is configured as a toroidal worm with a large transmission ratio. Compared with a cylindrical worm, there are more teeth in engagement and bearing forces at the same time, so the bearing capacity is higher. At the same time, the toroidal worm has excellent self-locking performance and is reliable in operation. The fan-shaped toroidal worm wheel of the seventh transmission member 7 and the toroidal worm are meshed for transmission. The thus constituted toroidal worm gear pair has a large reduction ratio and can achieve reverse self-locking. The main shaft fastened in the worm wheel is driven to rotate through torque amplification. The main shaft is equipped with photovoltaic panels. The main shaft drives the photovoltaic panels to face the sun to generate electricity. In the height direction, the configuration of the fourth transmission member 4 can improve the transmission stability, and at the same time can increase the distance between the second transmission member 2 and the main shaft, so that the diameter of the connecting part 12 can be configured to be larger, and the parallel driving device can be suitable for main shafts of various specifications, achieving high versatility.

One end of the sixth transmission member 6 is set as a tapered shaft end, and the tapered shaft end of the sixth transmission member 6 is fixedly connected with the fifth transmission member 5. By the configuration of the tapered shaft end which is connected to the fifth transmission member 5, a batch installation and production of the toroidal worm can be facilitated.

In practical applications, the first transmission member 1 and the second transmission member 2 are configured as bevel gears of the same specification, which effectively reduces the types of gears and reduces the cost. In this embodiment, the drive motor 8 is arranged on one side of the first transmission member 1 along a direction parallel to the axial direction of the seventh transmission member 7, which can improve the compactness of the overall structure. The end of the first transmission member 1 away from the drive motor 8 is provided with the first power output end 10, and the first power output end 10 is arranged parallel to the axis of the seventh transmission member 7. The second power output end 11 is provided on the side of the third transmission member 3 away from the second transmission member 2, and the second power output end 11 is arranged perpendicular to the axis of the seventh transmission member 7. Part of the power of the drive motor 8 is parallelly allocated to the north-south driven driver of the multi-point drive from one shaft end through the first power output end 10. The gears of the first transmission member 1 and the third transmission member 3 are connected to the corresponding shaft through shaft keys. Part of the power is vertically allocated to the east-west driven drive of the multi-point drive through the second power output end 11 from one side of the shaft. Part of the power is transmitted to the cylindrical gear of the fourth transmission member 4 at this point. The fourth transmission member 4 meshes with the cylindrical gear of the fifth transmission member 5. After deceleration and torque amplification, the fifth transmission member 5 and the toroidal worm of the sixth transmission member 6 are fixedly connected to drive the connecting part 12 to rotate.

Figure 10:
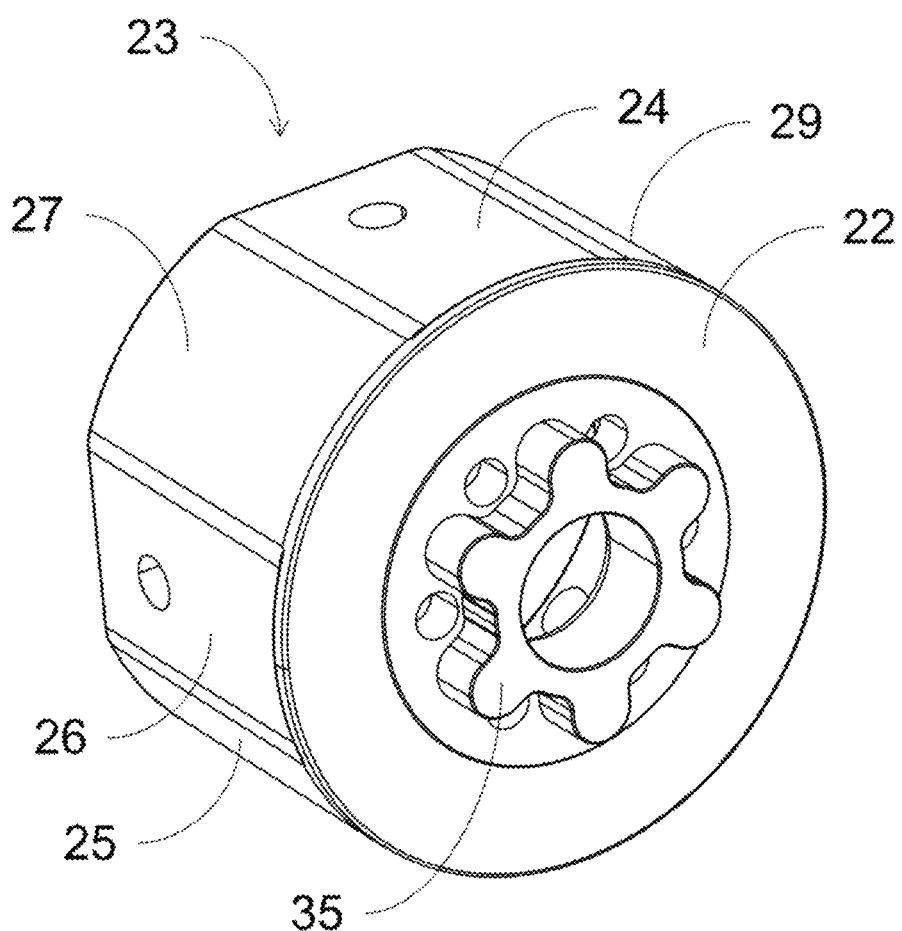
FIG. 10 is a schematic structural diagram of an embodiment of the connecting part.

In one embodiment, referring to FIG. 10, the connecting part 12 comprises an end portion 22 and a shaft head 23, wherein the end portion 22 is fixed to the seventh transmission member 7, and the outer contour of the cross-section of the shaft head 23 is a polygon of arcs and lines. The shaft head 23 is configured to engage a photovoltaic main shaft which has an inner contour of a polygon of arcs and lines.

Figure 11:
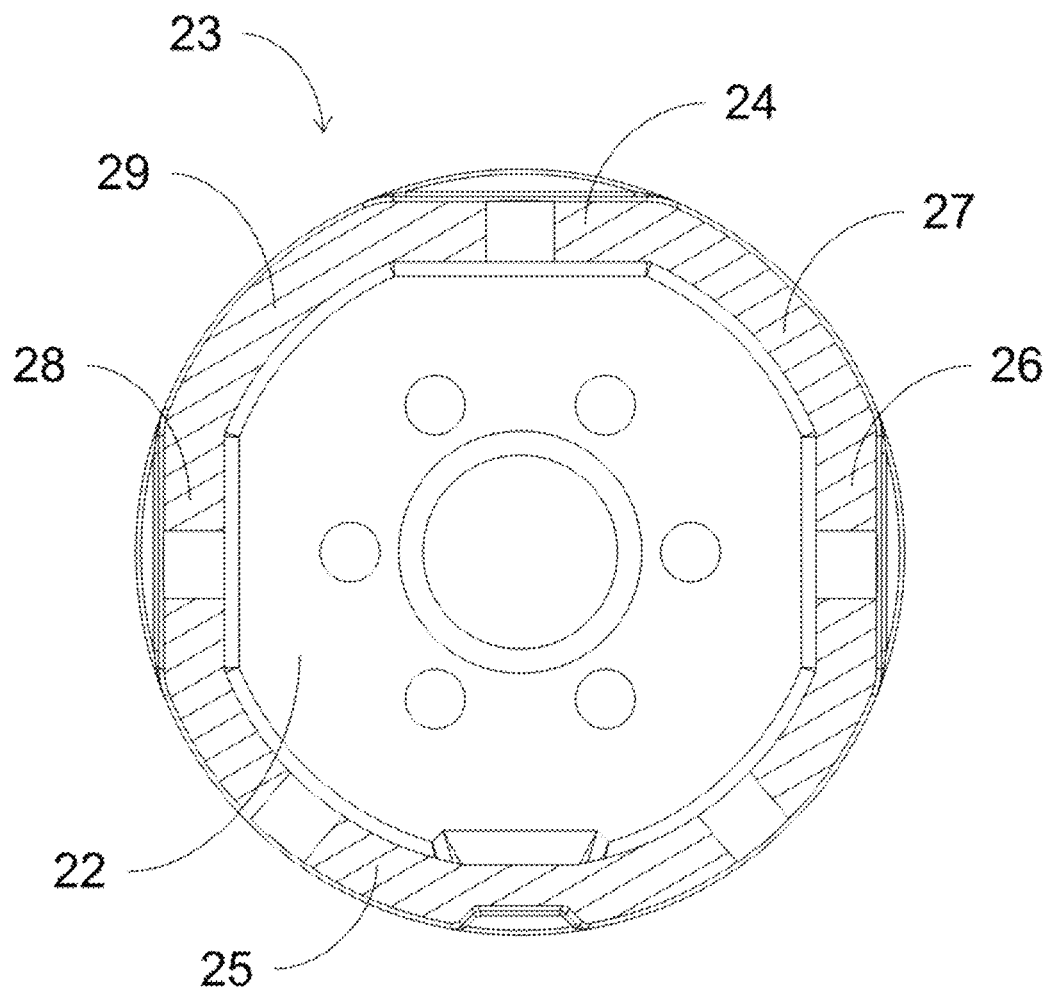
FIG. 11 is a cross-sectional view of the embodiment of the connecting part in FIG. 10.
Figure 12:
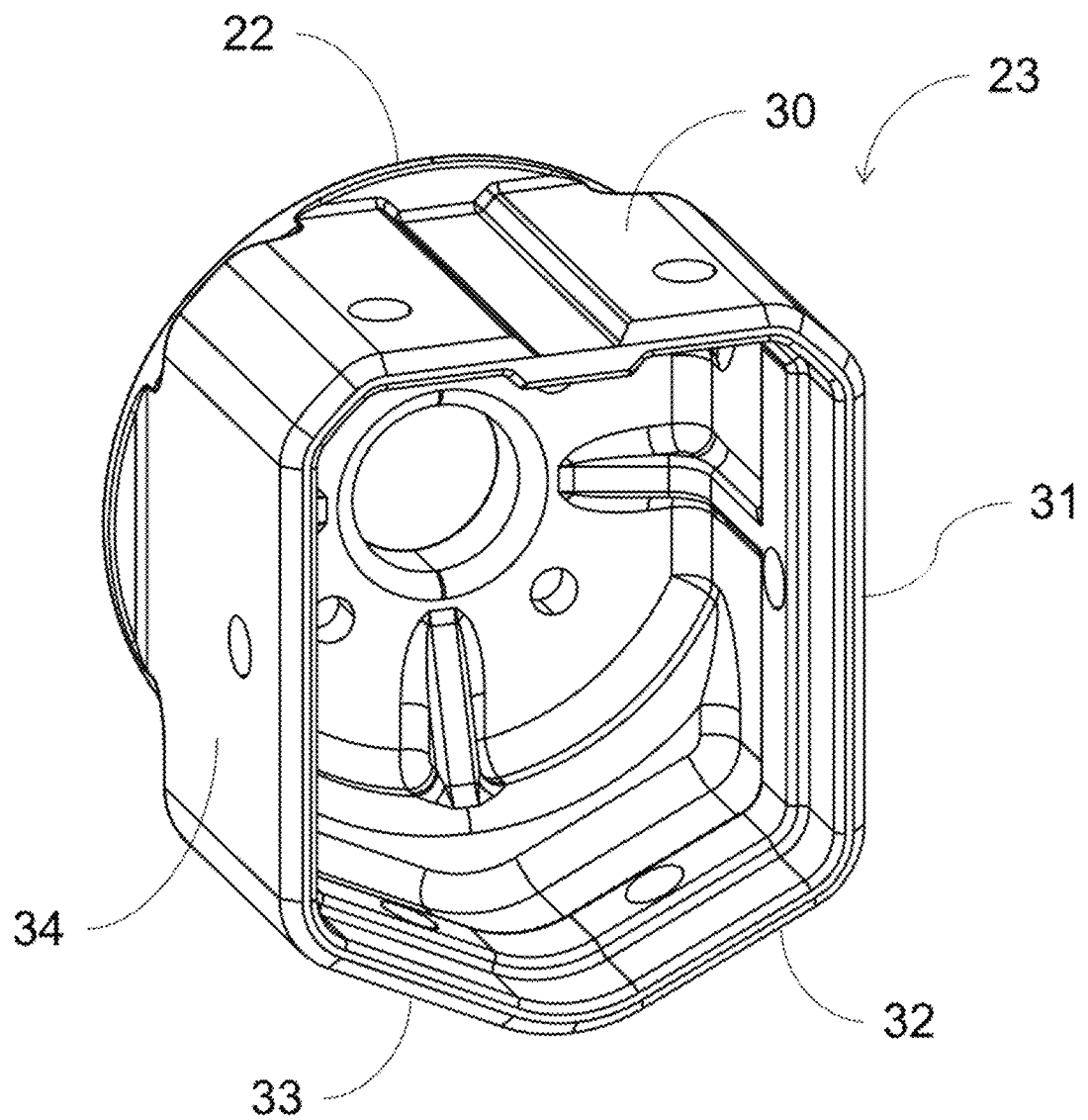
FIG. 12 is a schematic structural diagram of another embodiment of the connecting part.

Referring to FIG. 11 and FIG. 12, the shaft head 23 is configured at one side of the end portion 22 and comprises a first flat plate 24, a second flat plate 26, a third flat plate 28, a first arc plate 25, a second arc plate 27 and a third arc plate 29, wherein the first arc plate 25 is connected between the second flat plate 26 and the third flat plate 28, and the second arc plate 27 is connected between the first flat plate 24 and the second flat plate 26, and the third arc plate 29 is connected between the first flat plate 24 and the third flat plate 28, and the first arc plate 25, the second arc plate 27 and the third arc plate 29 are arc plates distributed on the same cylindrical surface, wherein the cylindrical surface is coaxial with the seventh transmission member 7.

Compared with the common square shaft head, D-shaped shaft head and other structures in the prior arts, the shaft head structure shaped in a polygon of arcs and lines in the present application enables the connecting part 12 to withstand higher bending moments. At the same time, with the same weight, the polygon of arcs and lines has a longer contour circumference than the square and D-shaped contours, so that it can achieve a higher torsional stiffness inertia, thereby it is able to transmit higher torques. The shaft head 23 can be fastened to the photovoltaic main shaft using mounting holes.

Figure 13:
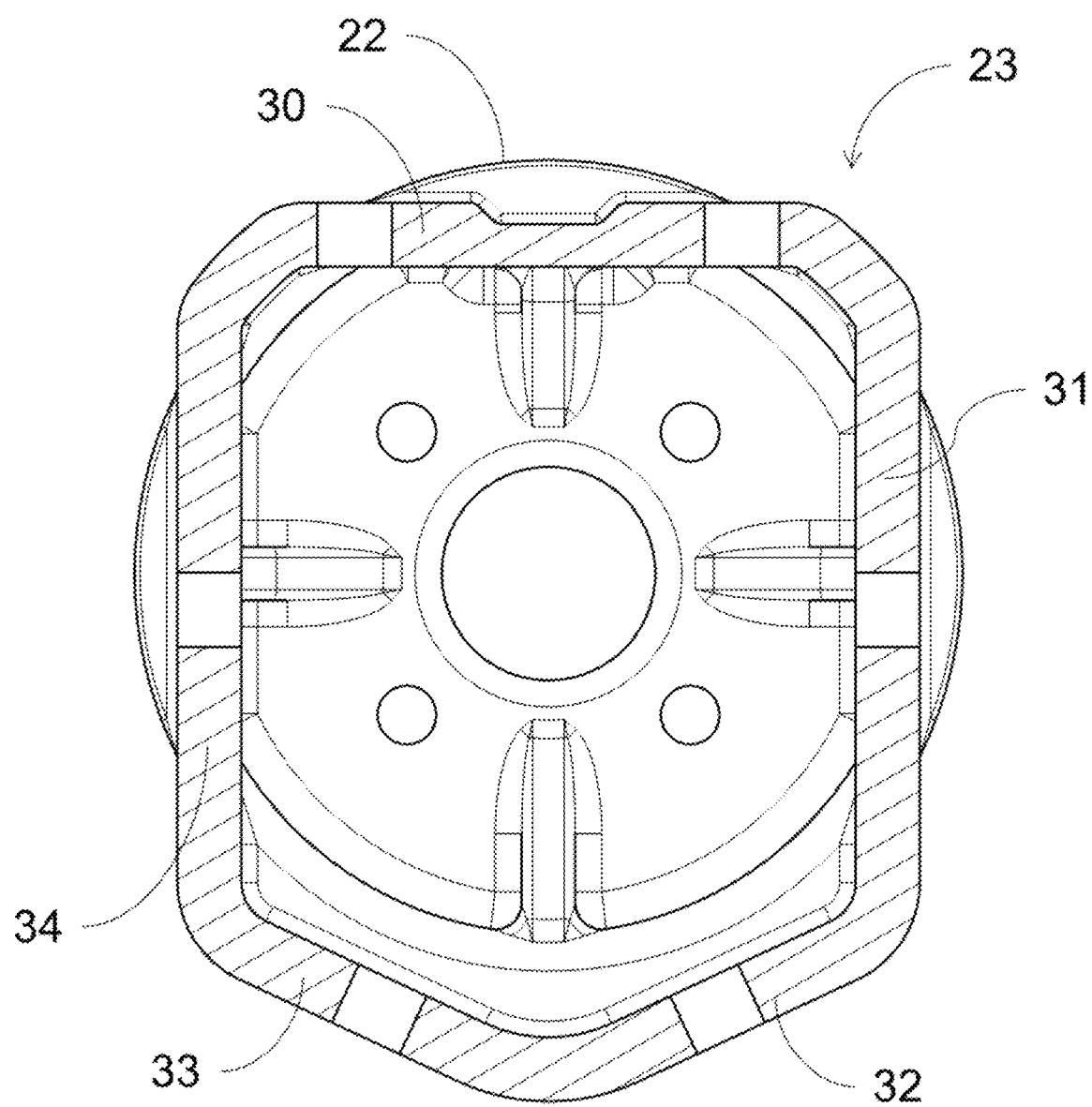
FIG. 13 is a cross-sectional view of the embodiment of the connecting part in FIG. 12.

In one embodiment, referring to FIG. 12, the connecting part 12 comprises an end portion 22 and a shaft head 23, wherein the end portion 22 is fixed to the seventh transmission member 7, and the shaft head 23 comprises a tubular wall extending from the end portion 22 to one side, and the cross section of the tubular wall is a convex pentagon, and the tubular wall is configured to fittingly insert into a photovoltaic main shaft with a convex pentagon inner contour. Referring to FIG. 13, the tubular wall comprises a first wall plate 30, a second wall plate 31, a third wall plate 32, a fourth wall plate 33 and a fifth wall plate 34, which are successively connected and constitute a contour of a convex polygon. Between the adjacent wall plates, corners or fillets are configured to achieve smooth connection and to facilitate the tight fitting between the tubular wall and the photovoltaic main shaft so as to maintain a stable positioning between them. Each wall plate is provided with one or more mounting holes used to fix the photovoltaic main shaft which has a convex pentagon inner contour.

Figure 14:
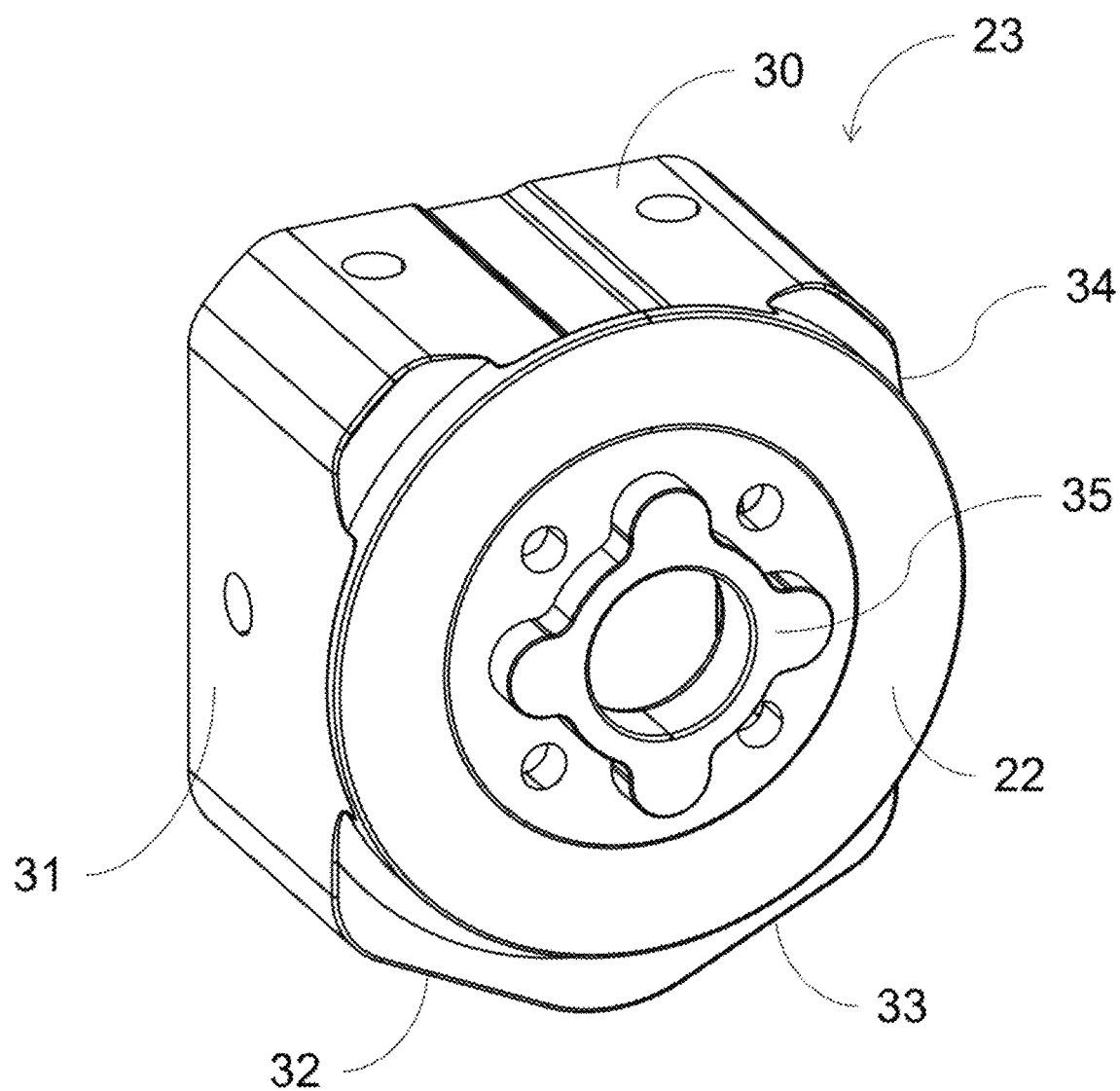
FIG. 14 is a three-dimensional diagram of the embodiment in FIG. 12 from another viewing angle.

In one embodiment, referring to FIG. 14, based on the above embodiments, the end portion 22 comprises a boss 35 extending away from the shaft head 23. Furthermore, the boss 35 comprises a plurality of petal-shaped structures that are circumferentially distributed. The adjacent petal-shaped structures are connected by arc-shaped segments to constitute a closed contour structure. As an example, the embodiment illustrated in FIG. 14 comprises four petal-shaped structures in half-cylindrical shape circumferentially and evenly distributed. Each petal-shaped structure and the corresponding arc-shaped segments are smoothly connected. Between adjacent petal-shaped structures, a mounting hole is respectively configured. The seventh transmission member 7 is provided with a groove structure which is paired with the boss 35. The boss 35 is configured to insert into the groove structure. Of course, the groove structure can also be configured on the end portion 22 while the boss structure can be configured on the seventh transmission member 7.

The parallel driving device of the present application adopts the configuration of a drive motor plus synchronous shafts, which achieves the above-mentioned parallel drive in a simple way, and there are synchronous shaft connections in the east-west direction, which reduces the length of the synchronous shafts to the second row. The installation of the driving device in this configuration is convenient. Compared with a single motor plus worm gear rotary drive, it has the advantages of low cost and convenient maintenance.

In the above-mentioned embodiments, the descriptions of each embodiment have their own emphases, and for parts that are not described or recorded in detail in a certain embodiment, reference may be made to relevant descriptions of other embodiments.

It should be noted that the above embodiments can be freely combined as required. The above are only preferred embodiments of the present application, and it should be pointed out that for those of ordinary skill in the art, some improvements and modifications can also be made without departing from the principles of the present application. It should be regarded as being within the protection scope of the present application.

The invention claimed is:

1. A parallel driving device, characterized in that, it comprising:
 a first transmission member;
 a second transmission member, which meshes with the first transmission member, wherein the first transmission member is axially perpendicular to the second transmission member;
 a third transmission member, arranged coaxially with the second transmission member;
 a fourth transmission member, which is located on an upper side of the third transmission member and meshes with the third transmission member, wherein the fourth transmission member is arranged axially in parallel with the third transmission member;
 a fifth transmission member, which is located on an upper side of the fourth transmission member and meshes with the fourth transmission member, wherein the fifth transmission member is arranged axially in parallel with the fourth transmission member;
 a sixth transmission member, which is arranged coaxially with the fifth transmission member;
 a seventh transmission member, which is located on an upper side of the sixth transmission member and meshes with the sixth transmission member, wherein the seventh transmission member is axially perpendicular to the sixth transmission member, and the seventh transmission member is arranged above the first transmission member and axially in parallel with the first transmission member;
 wherein the first transmission member is configured on a first shaft, and an end of the first shaft is adapted to be connected to a driving end of a drive motor, which constitutes a power input end of the parallel driving device; and the other end of the first shaft constitutes a first power output end of the parallel driving device;
 and wherein planes where end surfaces of the third transmission member, end surfaces of the fourth transmission member and end surfaces of the fifth transmission member locate are at a same side of the first transmission member, the second transmission member, the sixth transmission member and the seventh transmission member;

and wherein the third transmission member is configured on a third shaft, and the fourth transmission member is configured on a fourth shaft, and the fifth transmission member is configured on a fifth shaft, and a part of one of the third shaft, the fourth shaft, the fifth shaft constitutes a second power output end of the parallel driving device;

wherein the seventh transmission member serves as a route of parallel output, and the first power output end and the second power output end both serve as parallel outputs, so that the parallel driving device can be applied to a multi-point synchronously driven solar tracking system to achieve parallel driving.

2. The parallel driving device as claimed in claim 1, further comprising:

a drive motor, located axially on either side of the first transmission member, wherein the drive motor is connected to the first transmission member, and by driving the first transmission member to rotate, the drive motor drives the second transmission member, the third transmission member, the fourth transmission member, the fifth transmission member, the sixth transmission member and the seventh transmission member to rotate synchronously.

3. The parallel driving device as claimed in claim 2, further comprising:

a housing, wherein the first transmission member, the second transmission member, the third transmission member, the fourth transmission member, the fifth transmission member, the sixth transmission member and the seventh transmission member are arranged inside the housing.

4. The parallel driving device as claimed in claim 3, characterized in that, both ends of the first shaft pass through the housing and are exposed outside the housing, and a driving end of the drive motor is directly connected to one end of the first shaft.

5. The parallel driving device as claimed in claim 3, characterized in that, the part that constitutes the second power output end is exposed outside the housing.

6. The parallel driving device as claimed in claim 1, characterized in that, a bearing seat is fixed onto the third shaft or onto the fifth shaft, and the bearing seat has a mounting part protruding in a radial direction of the third shaft or the fifth shaft, and the fourth transmission member is installed onto the mounting part through a fourth shaft, wherein the fourth transmission member and the fourth shaft are configured to rotate relative to the mounting part, and the fourth shaft is parallel to both the third shaft and the fifth shaft, and two sides of the fourth transmission member in a height direction mesh with the third transmission member and the fifth transmission member respectively.

7. The parallel driving device as claimed in claim 6, characterized in that, the mounting part is provided with at least two mounting holes, and the fourth shaft is mounted in one of the mounting holes, wherein the centers of the two mounting holes are located on an arc, and the fourth shaft is configured to be installed in either of the mounting holes.

8. The parallel driving device as claimed in claim 6, characterized in that, the third transmission member, the fourth transmission member and the fifth transmission member are all configured as gears, and axes of the third transmission member, the fourth transmission member and the fifth transmission member are parallel to each other, and numbers of teeth of the third transmission member, the fourth transmission member and the fifth transmission member increase sequentially.

9. The parallel driving device as claimed in claim 1, characterized in that, the sixth transmission member is a toroidal worm, and the seventh transmission member is a worm wheel, wherein the worm meshes with the worm wheel in transmission, and end surfaces on both sides of the worm wheel are respectively provided with a connecting part, and the connecting parts constitute third power output ends of the parallel driving device.

10. The parallel driving device as claimed in claim 9, characterized in that, the connecting part comprises an end portion and a shaft head, wherein the end portion is fixed to the seventh transmission member, and an outer contour of a cross-section of the shaft head is a polygon of arcs and lines, and the shaft head is configured to engage a photovoltaic main shaft which has an inner contour of a polygon of arcs and lines; and the shaft head comprises a first flat plate, a second flat plate, a third flat plate, a first arc plate, a second arc plate and a third arc plate, wherein the first arc plate is connected between the second flat plate and the third flat plate, and the second arc plate is connected between the first flat plate and the second flat plate, and the third arc plate is connected between the first flat plate and the third flat plate, and the first arc plate, the second arc plate and the third arc plate are arc plates distributed on a same cylindrical surface, wherein the cylindrical surface is coaxial with the seventh transmission member.

11. The parallel driving device as claimed in claim 9, characterized in that:

the connecting part comprises an end portion and a shaft head, wherein the end portion is fixed to the seventh transmission member, and the shaft head comprises a tubular wall extending from the end portion to one side, and a cross section of the tubular wall is a convex pentagon, and the tubular wall is configured to fittingly insert into a photovoltaic main shaft which has a convex pentagon inner contour; and the tubular wall is provided with a plurality of circumferentially distributed mounting holes to fix the photovoltaic main shaft which has a convex pentagon inner contour.

* * * * *